R. E. HELLMUND.
FIELD CONTROL SYSTEM FOR SINGLE PHASE COMMUTATOR MOTORS.
APPLICATION FILED APR. 12, 1916.

1,276,912.

Patented Aug. 27, 1918.
4 SHEETS—SHEET 1.

WITNESSES:

INVENTOR
Rudolf E. Hellmund.
BY
ATTORNEY

R. E. HELLMUND.
FIELD CONTROL SYSTEM FOR SINGLE PHASE COMMUTATOR MOTORS.
APPLICATION FILED APR. 12, 1916.

1,276,912.

Patented Aug. 27, 1918.
4 SHEETS—SHEET 3.

WITNESSES:
Fred. A. Lind.
D. C. Davis.

INVENTOR
Rudolf E. Hellmund
BY
Wesley G. Carr
ATTORNEY

R. E. HELLMUND.
FIELD CONTROL SYSTEM FOR SINGLE PHASE COMMUTATOR MOTORS.
APPLICATION FILED APR. 12, 1916.
1,276,912.
Patented Aug. 27, 1918.
4 SHEETS—SHEET 4.
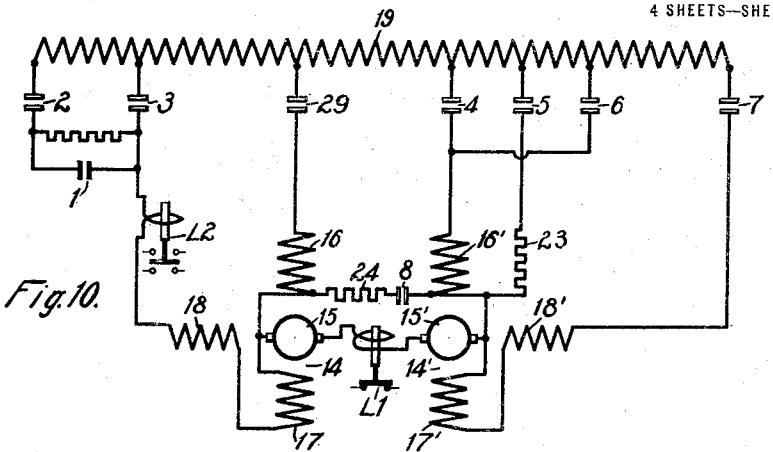
Fig. 10.
Sequence of Switches.
| | 1 | 2 | 3 | 4 | 5 | 6 | 7 | 8 | 29 | |
|---|---|---|---|---|---|---|---|---|---|---|
| A | | | o | | | | | | o | R1 |
| B | | o | o | | | | | | o | |
| C | | o | | | | | | | o | |
| D | o | o | | | | | | | o | R2 |
| E | o | o | | o | | | | o | o | |
| F | o | o | | o | | o | o | | o | R3 |
| G | o | o | | o | o | o | o | | o | |
| H | o | o | | | o | o | o | | o | R4 |
| I | o | o | | | o | o | o | | o | |
| J | o | o | | | o | | o | | o | R5 |
Fig. 11.
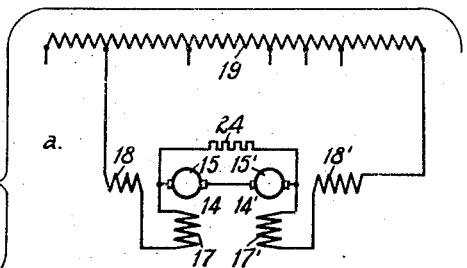
a.
Fig. 12.
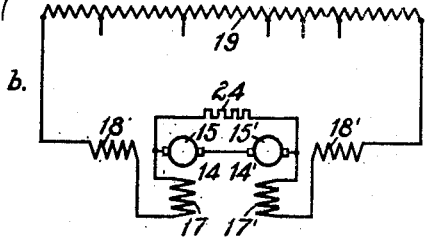
b.
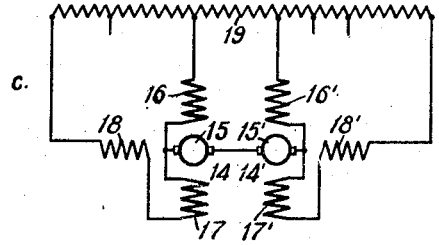
c.
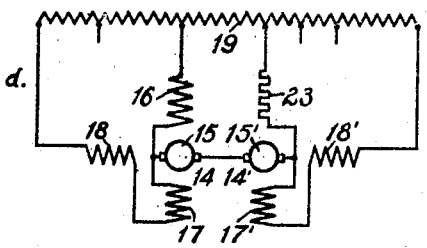
d.
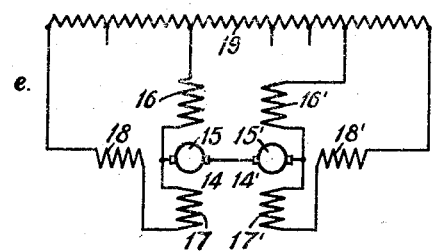
e.
WITNESSES:
R. J. Fitzgerald.
D. C. Davis.
INVENTOR
Rudolf E. Hellmund.
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

FIELD-CONTROL SYSTEM FOR SINGLE-PHASE COMMUTATOR-MOTORS.

1,276,912.

Specification of Letters Patent.    Patented Aug. 27, 1918.

Application filed April 12, 1916. Serial No. 90,703.

*To all whom it may concern:*

Be it known that I, RUDOLF E. HELLMUND, a subject of the German Emperor, and a resident of Pittsburgh, in the county of Allegheny and State of Pennsylvania, have invented a new and useful Improvement in Field-Control Systems for Single-Phase Commutator-Motors, of which the following is a specification.

My invention relates to systems of control for dynamo-electric machinery, more specifically for alternating-current motors of the compensated commutator type, and it has for its objects to provide a system of the character designated that shall at all times maintain the strength of the main field at such values as to insure ample torque and good commutation under varying conditions of speed and of load.

Another object of my invention is to provide a system of the character designated whereby a plurality of alternating-current, commutator motors may be used in conjunction with but few control switches, many of said switches being of small size because carrying only a portion of the full-load armature current.

Figure 1:
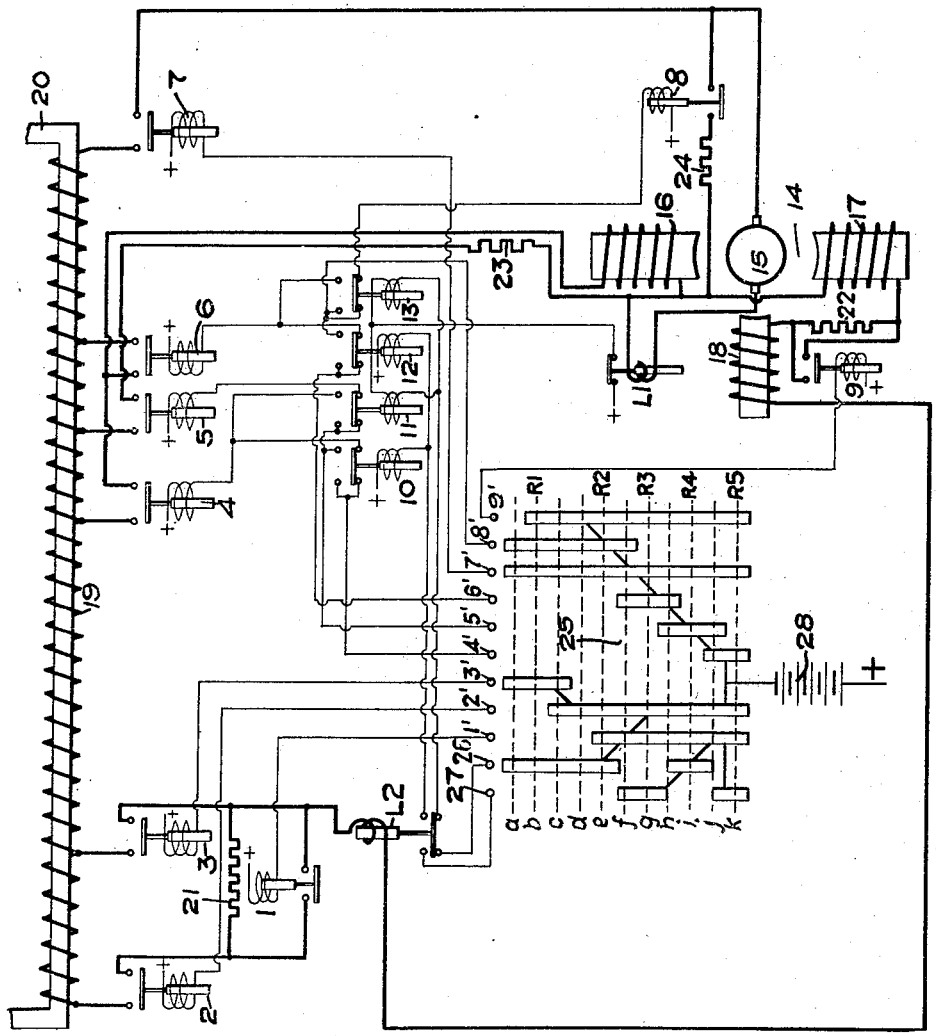
Figure 2:
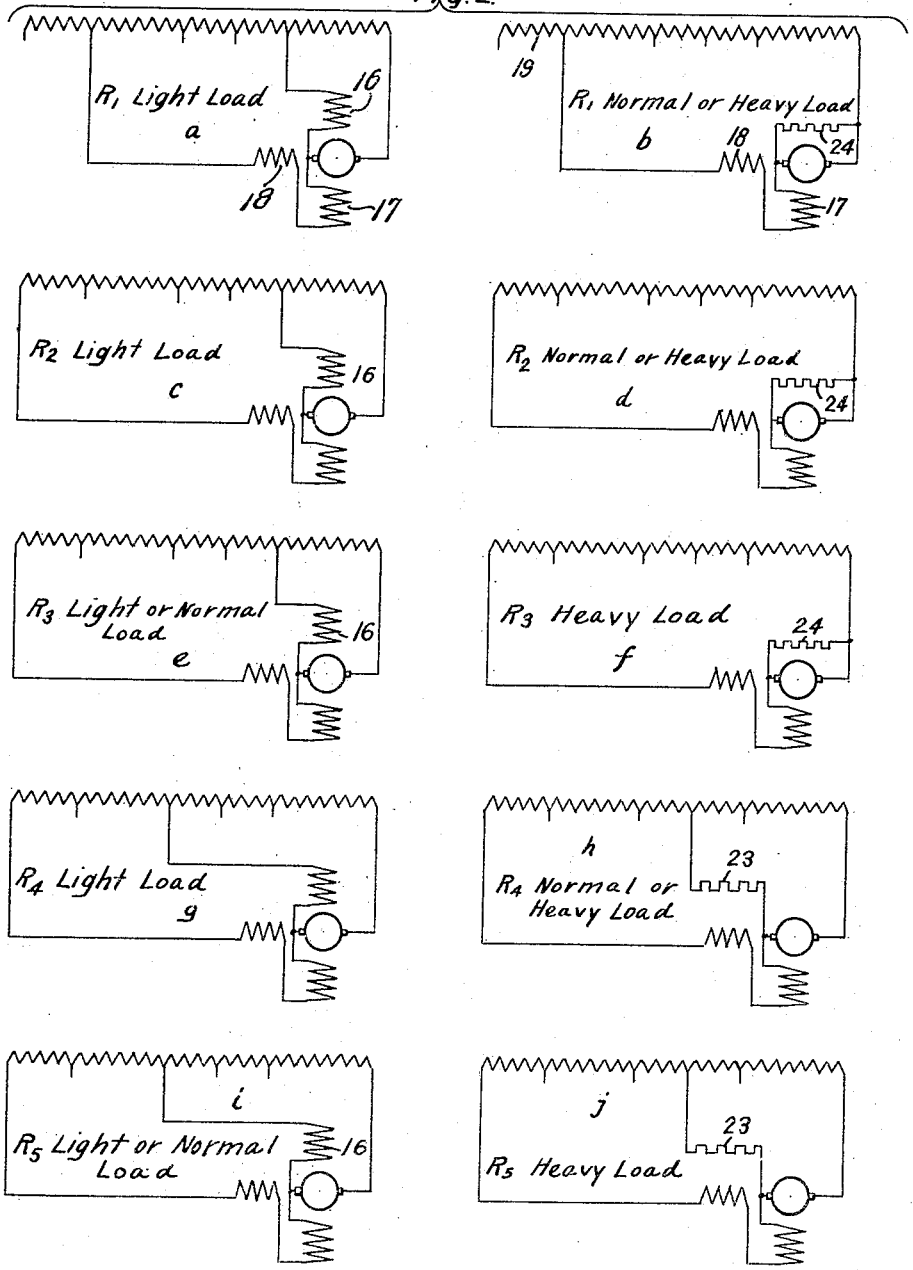
Figure 3:
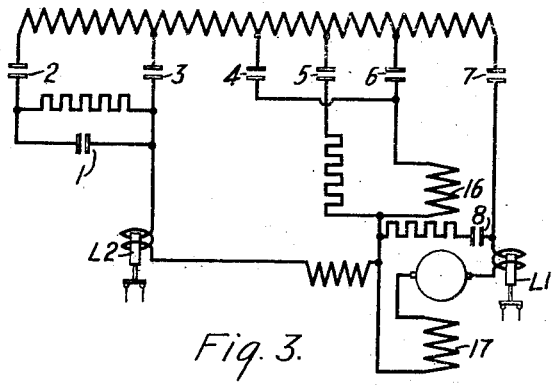
Figure 4:
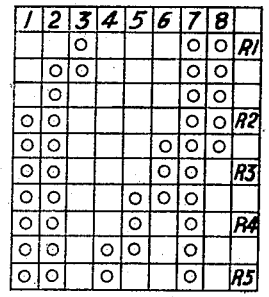

In the accompanying drawing, Figure 1 is a diagrammatic view of an alternating-current motor of the compensated, commutator type, together with its attendant supply and control circuits, embodying a preferred form of my invention; Fig. 2 is a group of simplified diagrammatic views illustrating the development of the connections in the system of Fig. 1, when operated in accordance with my invention; Figs. 3, 5, 6, 7 and 8 are simplified diagrammatic views of modifications of the system shown in Fig. 1; Figs. 4 and 9 are sequence charts setting forth the preferred order of switch operation in the systems of Figs. 3 and 8, respectively; Fig. 10 is a diagrammatic view illustrating the method of employing a system of the character shown in Fig. 1 in conjunction with a plurality of motors; Fig. 11 is a sequence chart illustrating the preferred order of switch operation in the system of Fig. 10; and Fig. 12 is a group of simplified diagrammatic views illustrating the development of the connections in the system of Fig. 10 when the switches thereof are manipulated in accordance with Fig. 11.

It is a well known fact that, in the operation of alternating-current motors of the commutator type, the relation of the main field winding to the short circuited armature coils undergoing commutation is such as to establish a transformer action therebetween, resulting in the development of disastrous sparking voltages in said short circuited coils if the armature is not rotating sufficiently rapidly to develop a counteracting rotational electromotive force by cutting the cross field.

In the acceleration of a motor, it is frequently possible to permit a much stronger excitation of the main field winding relative to the excitation of the armature winding under light-load conditions than under heavy-load conditions and still remain within permissible commutating limits.

By my invention, I provide a system of this character, the main field winding being split into two portions and means being provided for exciting one only of said portions under heavy-load conditions and for exciting both of said portions under light-load conditions, resulting in a much stronger field relative to the armature field under light-load conditions than under heavy-load conditions.

In its preferred form, my invention is applied to motors of the well known doubly-fed type wherein the armature, main and cross field windings are connected in series relation across the source and wherein an additional connection is provided from an intermediate point in said series to the source. Motors of this character are generally provided with more turns in the cross field winding than in the armature field winding, resulting in a smaller cross field current than armature current, the difference between the cross field and armature field currents flowing to or from the source through said intermediate tap.

In the use of a subdivided main field winding in accordance with a desirable form of my invention, the portion of the main field winding that is continually in circuit is arranged to carry the cross field current and the remainder of the main field winding that is inserted in circuit only during light-load conditions is inserted in said intermediate tap. By having one portion of the main field winding excited with the cross field current and by having the remaining portion of the main field winding excited by the difference between the armature and cross field currents, the resultant main field provided by the joint action of said two main field windings is in phase with the armature current, resulting in maximum possible operating torque.

Further details and features of my invention will appear hereinafter more in detail.

Referring to Figs. 1 and 2, I show an alternating-current motor of the compensated commutator type at 14, said motor being provided with an armature 15, two main field windings 16 and 17 and a cross field winding 18. Energy for the operation of the motor 14 is derived from any suitable source, such, for example, as the secondary winding 19 of a transformer 20. The outer or left hand terminal of the cross field winding 18 may be connected to different points in the winding 19 by the manipulation of suitable switches 1, 2 and 3 and of a preventive device 21. The current supplied to said outer cross field terminal flows through the energizing winding of a limit switch L2. The inner terminal of the cross field winding 18 is connected to the lower terminal of the main field winding 17 through a resistor 22, and said resistor may be short circuited by closing a switch 9. The upper terminal of the main field winding 17 and the lower terminal of the main field winding 16 are permanently connected together and are further connected to the left hand or inner armature brush through the energizing winding of a limit switch L1.

The upper terminal of the main field winding 16 may be connected to intermediate points in the supply winding 19 by the manipulation of suitable switches 4 and 6. The inner armature brush may be connected to an intermediate point in the source through a resistor 23 and a switch 5 without including the main field winding 16 in circuit. The outer or right hand brush of the armature 15 may be connected to a point near the right hand end of the supply winding 19 by closing a switch 7 and the armature may be short circuited through a resistor 24 by the closure of a switch 8.

The switches 1 to 9, inclusive, are operable by any suitable means, such, for example, as a drum or master controller 25 which may be operated either manually or by air pressure or by other means, as desired. The limit switch L1 is set to lift with a value of the load current which marks the transition from light to normal load, and, in like manner, the limit switch L2 is set to lift only with the much heavier currents marking the transition from normal to heavy load. The two limit switches assist in the operation of a control system in accordance with my invention through the instrumentality of auxiliary relays 10 to 13, inclusive, as will hereinafter more fully appear.

Having thus described the arrangement of a system embodying my invention, the operation is as follows: The movement of the controller 25 to the position $a$ energizes the fingers 26, 3', 7' and 8' from a suitable battery 28 and closes the switches 3 and 7 and the switch 8 if either the limit switch L1 or the limit switch L2 is in raised position. Movement of the controller 25 to the position $bR'$ energizes, in addition, the finger 9', closing the switch 9 and eliminating the resistor 22 from circuit, establishing, under normal or heavy load conditions, the connections shown in Fig. 2$^b$. The armature, main field winding 17 and cross field winding 18 are connected across a portion of the winding 19 and the armature is short circuited through a resistor 24 for repulsion operation.

If the load on the motor is very light, as, for example, when starting on a down grade, it is permissible to provide the same with a strong field excitation and, under these conditions, the limit switches L1 and L2, energized below their settings, make contact with their lower contact studs, and energy flows from the finger 26 through the lower studs of the limit switch L2, the winding of the switch 13 and the studs of the limit switch L1 to the positive pole of the battery. The consequent operation of the switch 13 breaks the energizing circuit of the winding of the switch 8 and closes a circuit of the winding of the switch 6, introducing the main field winding 16 into circuit, thus removing the repulsion connection and establishing a doubly-fed connection, as indicated in Fig. 2$^a$.

The movement of the controller 25 to the positions $c$, $d$ and $eR2$ operates the switches 1, 2 and 3 to raise the voltage on the outer cross-field terminal, thus increasing the speed and bringing about the connections of the second running position $eR2$, indicated in Fig. 2$^c$ and Fig. 2$^d$. The control of the limit switches L1 and L2 is exerted in the same manner as indicated in connection with the first running position $bR^1$. Thus, in Fig. 2$^c$, the main field winding 16 is in circuit as in Fig. 2$^a$ but the total motor voltage is greater and, in like manner, under normal or heavy load, the armature is short circuited as shown in Fig. 2$^d$ for repulsion operation but the motor voltage is greater than in Fig. 2$^b$.

In the further acceleration of the motor 14, it is now desirable that, under light or normal load, the main field winding shall be in circuit and that the repulsion connection shall be retained only under heavy-load conditions. For this purpose, the limit switch L2, having a greater load setting than the limit switch L1, serves to distinguish between what may be termed normal loads and heavy loads and the setting of the limit switch L1 serves to distinguish between what may be termed light loads and what may be termed normal loads. With this adjustment of the limit switches, passage is made through the accelerating position $f$, wherein the switch 6 is directly energized and the third running position $g$R3 is next reached. Assuming a light or normal load, the switch L2 is down and the lower contacts thereof are not energized because the finger 26 is not making contact with a charged segment. The switches 1, 2, 6, 7 and 9 are closed, establishing the circuit of Fig. 2$^e$, which is in all respects similar to the circuit in Fig. 2$^c$. Under heavy load, however, the limit switch L2 rises and closes a circuit from the contact finger 27 through the winding of the switch 12 and operates the latter, breaking the supply circuit of the switch 6 and closing the circuit of the switch 8, establishing the repulsion connection of Fig. 2$^f$ which is the same as that of Fig. 2$^d$.

In the fourth running position $i$R4, it is desirable to eliminate the repulsion connection, even under heavy-load conditions, but it is not yet desirable to energize both portions of the main field winding under normal or heavy-loading conditions. Under light load in said position $i$R4, the limit switches L1 and L2 are both down and the switches 1, 2, 5, 7 and 9 would be closed except for the fact that the energization of the contact finger 26 energizes the winding of the switch 11 through the contact studs of the two limit switches and operates said switch 11, opening the switch 5 and closing the switch 4, inserting the main field winding 16 in circuit and establishing the connections shown in Fig. 2$^g$. These connections are similar to those of Fig. 2$^e$ except for a greater armature voltage. Under normal or heavy-load conditions in the running position $i$R4, the limit switch L1 is lifted to break the energizing circuit of the switch 11. The switch 11 is accordingly in its lower position and the switch 5 is energized, closing the mid tap to the inner armature brush through the resistor 23 and eliminating the main field winding 16 from circuit, all as indicated in Fig. 2$^h$.

In the final running position $k$R5, it is desirable that the main field winding 16 be in circuit under both light and normal-load conditions and that the intermediate tap be closed through the resistor 23 only under heavy-load conditions. A segment of the drum 25 is therefore arranged to energize the finger 27, and the occurrence of a heavy load raises the limit switch L2, energizing the winding of the switch 10 and opening the circuit of the switch 4 while closing that of the switch 5, thus establishing the circuit of Fig. 2$^j$. A light or normal load in the position $k$R5 fails to raise the limit switch L2 and the lower contact studs thereof are deënergized by reason of the failure of the finger 26 to make contact with any segment on the drum 25.

While I have described my invention as applied to a mechanism for shifting from repulsion to doubly-fed connection under differing amounts of load, it is obvious that it may be applied to shifting the connections from reversed doubly-fed to repulsion and then to direct doubly-fed or from reversed doubly-fed to straight doubly-fed without changing the spirit thereof. The advantages and operating features of these different types of connections are well known and understood and are fully described in an article by the applicant and J. V. Dobson, appearing on page 112 *et seq.* of the "*Electric Journal*" for March, 1916.

With the system just disclosed in Fig. 1, the portion 17 of the main field winding that is at all times in circuit is energized with the cross-field current, whereas the portion 16 of the main field winding that is inserted in circuit under light or normal-load conditions is energized with the vector difference between the armature and cross field currents. The system of Fig. 3 is, in many respects, and particularly in its operating characteristics, similar to that of Fig. 1, but the portion 17 of the main field winding, when in circuit, is energized by the armature current rather than by the cross-field current, the portion 16 of the main field winding being, at all times, energized by the vector difference between the armature and cross field currents. The sequence of switch operation in the circuit of Fig. 3 is analogous to that of Fig. 1 and is set forth in detail in the sequence chart of Fig. 4.

Figure 5:
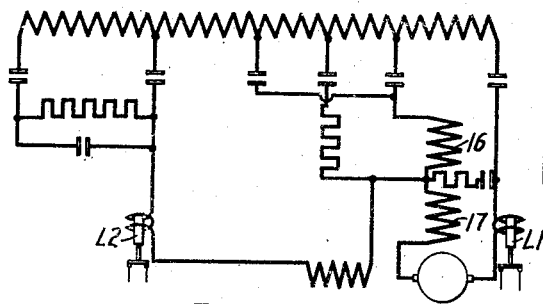

The circuit of Fig. 5 is substantially identical with that of Fig. 3, the two portions 16 and 17 of the main field winding being shown on the same side of the armature in order to indicate that, by reversing the fields as a whole, a reversal of the motor may be accomplished, assuming that the two portions of the main field windings are of substantially the same magnitude.

While I have shown two distinct main field windings, it is obvious that equally effective results may be obtained by providing a single main field winding with a tap to its mid point, treating the two halves of said winding as the two distinct windings of this application as disclosed to this point. A structure of this general character is disclosed in my copending application, Serial No. 76,154, filed Feb. 4, 1916.

Figures 6, 7:
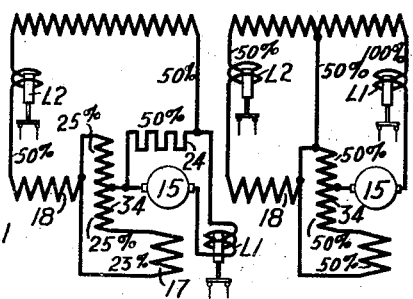

Similarly, I may provide a single main field winding with an inductive device in shunt thereto having a tap at an intermediate point as a substitute for the two distinct main field windings in any of the systems shown in the present application. An arrangement of this character is indicated in Figs. 6 and 7. In Fig. 6, the motor is shown connected for repulsion operation, with the resistor 24 in the armature short circuit and of such value that 50% of the armature current flows therethrough, the remaining 50% of the armature current flowing from the source, through the armature, thence dividing, one-half or 25% of the armature current flowing through the lower half of an inductive device or auto-transformer 34 and the main field winding 17 to the inner cross field terminal, and the remaining 25% flowing through the upper half of the device 34 directly to said terminal, resulting in the excitation of the cross-field winding with 50% of the armature current and of the main field winding with 25% of the armature current.

In Fig. 7, the repulsion connection is eliminated and an intermediate tap for doubly-fed operation is substituted therefor. 100% of the armature current flows from the source through the armature, 50% thereof flows through the upper half of the device 34 and returns to the source and the remaining 50% flows through the lower half of the device 34, the main field winding 17 and the cross field winding 18 resulting in twice the main field strength, with respect to the armature current, that was present in the repulsion connection. This doubling of the main field strength corresponds to the effect of inserting the additional main field winding in the system of Fig. 1, and the change from repulsion to doubly-fed connection in accordance with the load and speed may be effected by limit switches L1 and L2 in the same manner as previously described.

The use of an auto-transformer or balancing coil in a similar relation to that indicated in Figs. 6 and 7 for assisting in regulating the main field strength is also described in my copending application, Serial No. 76,155, filed Feb. 4, 1916.

Figure 8:
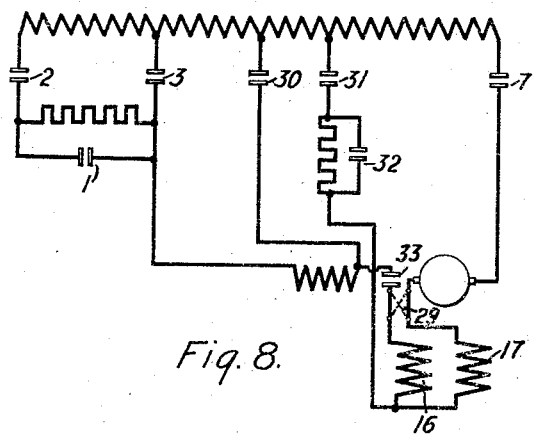
Figure 9:
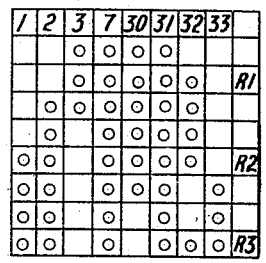

The circuit of Fig. 8 differs from those preceding by reason of the fact that the portion 17 of the main field winding, which is continually in circuit, carries armature current, and the portion 16 of the main field winding, when it is included in circuit, carries the cross field current rather than the difference between the cross field and armature field currents, as in the system of Fig. 3. If the two portions 16 and 17 of the main field winding are similar in magnitude, they may be bodily interchanged in function, and the motor may be reversed by a suitable reversing switch 29. The general principles of the motor acceleration are similar to those previously indicated and are indicated in the sequence chart of Fig. 9.

In applying my invention to the control of a plurality of motors, it may be desirable to employ the system of connections shown in Fig. 10. A pair of motors 14 and 14′, provided, respectively, with armatures 15 and 15′, main field windings 16 and 16′, additional main field windings 17 and 17′ and cross field windings 18 and 18′, are connected to be energized from a supply winding 19 through suitable control switches 1 to 8, inclusive, and 29, as shown. In the first running position $bR'$ in the sequence chart of Fig. 11, the switches 3, 7 and 8 are closed, establishing the connections shown in Fig. $12^a$, the armatures being short-circuited through a resistor 24 and the cross field windings 18 and 18′ and the main field windings 17 and 17′ being connected in series. Limit switches L1 and L2, similar to those of Fig. 1, are employed to eliminate said repulsion connection and to insert the main field windings 16 and 16′ in circuit under light-load conditions as shown in Fig. $2^a$, if desired. In like manner, in the running position R2, indicated in Fig. $12^b$, there is a repulsion connection on the armatures as in Fig. $2^d$ but the total motor voltage is raised from its value in Fig. $12^a$. The connection of Fig. $12^b$ may be altered to a doubly-fed connection, with the main field windings 16 and 16′ in circuit, by the operation of the limit switches L1 and L2 under light-load conditions, in a manner analogous to that shown in Fig. $2^c$. Fig. $12^c$ is analogous to Fig. $2^e$ but would be altered to a repulsion connection analogous to that of Fig. $2^f$ under heavy-load conditions. The connection of Fig. $12^d$, wherein the main field winding 16 and the resistor 23 are in circuit under light-load conditions, corresponds to Fig. $2^g$ and is slightly better adapted, as a transitory step, than would be a connection wherein the auxiliary main field windings of both motors are inserted in circuit, as would be necessary in a strict parallel to the connection of Fig. $2^g$.

The circuit of Fig. $12^e$ is analogous to that of Fig. $2^i$, having a greater armature voltage than the system of Fig. $12^c$ and being adapted for light or normal-load operation. The operation of the limit switch L2 is designed to eliminate the main field winding 16′ and to insert the resistor 23 in lieu thereof, in a manner analogous to that of Fig. $2^j$.

While I have shown my invention in a plurality of forms, it will be obvious to those skilled in the art that it is susceptible of various minor changes and modifications without departing from the spirit thereof, and I desire, therefore, that only such limitations shall be placed thereupon as are imposed by the prior art or indicated in the appended claims.

I claim as my invention:

1. The combination with an alternating-current motor of the commutator type provided with a plurality of main field windings, of means adapted for continuously energizing one of said main field windings, and means adapted for energizing the other of said main field windings at predetermined speeds under conditions of light load only.

2. The combination with an alternating-current motor of the commutator type provided with a plurality of main field windings, of means adapted for continuously energizing one of said main field windings, means adapted for energizing the other of said main field windings at predetermined speeds under light load only, and means for short circuiting the armature winding of said motor at corresponding speeds under heavy load.

3. The combination with an alternating-current motor of the commutator type provided with a plurality of main field windings, of means adapted for energizing one of said main field windings, means for inserting the other of said main field windings in an intermediate connection to said motor at predetermined speed under light-load conditions and for eliminating said winding from said connection under heavy-load conditions, and means for short circuiting the armature of said motor under said heavy-load conditions.

4. The combination with an alternating-current motor of the compensated commutator type provided with a plurality of main field windings, of means for connecting the armature, cross-field and one of said main field windings in series and for connecting said series to a current source, means for establishing an intermediate connection including another main field winding from a point in said series to a source under light loads only at predetermined speeds, and means for short circuiting the armature of said motor at corresponding speeds under heavy load.

5. The combination with an alternating-current motor of the compensated commutator type provided with a plurality of main field windings and with a current-limiting device, of means for connecting the armature, cross-field and one of said main field windings in series and for connecting said series to a current source, means for establishing an intermediate connection including another main field winding from a point in said series to a source under light loads only at predetermined speeds, and means for replacing said additional main field winding by a current-limiting device at corresponding speeds under heavy load.

6. The method of operating an alternating-current motor of the compensated, commutator type provided with a plurality of main field windings which comprises connecting said motor for doubly-fed operation at certain speeds under light load, with one of said main field windings in the intermediate tap, and connecting said motor for other than doubly-fed operation at corresponding speeds under heavy load, with said last named field winding eliminated from the circuit.

7. The method of operating an alternating-current motor of the compensated, commutator type provided with a plurality of main field windings which comprises connecting said motor for doubly-fed operation at certain speeds under light load, with one of said main field windings in the intermediate tap, and connecting said motor for repulsion operation at corresponding speeds under heavy load, with said last named main field winding eliminated from circuit.

8. The method of operating an alternating-current motor of the compensated, commutator type provided with a plurality of main field windings which comprises connecting said motor for doubly-fed operation at certain speeds under light load, with one of said main field windings in the intermediate tap, and connecting said motor for doubly-fed operation, with said last named main field winding replaced by a current-limiting device at corresponding speeds under heavy load.

9. The method of operating an alternating-current motor of the compensated, commutator type provided with a plurality of main field windings which comprises connecting said motor for doubly-fed operation at certain speeds under light load, with one of said main field windings in the intermediate tap, connecting said motor for repulsion operation at corresponding speeds under heavy load, and, at higher speeds, connecting said motor for doubly-fed operation, with said main field winding in the intermediate tap under light load and for doubly-fed operation with said main field winding replaced by a current-limiting device under heavy load.

10. The method of operating an alternating-current motor of the compensated, commutator type provided with a plurality of main field windings which comprises connecting said motor for doubly-fed operation at certain speeds under light load, with one of said main field windings in the intermediate tap, and eliminating said main field winding at corresponding speeds under heavy load.

11. The method of operating a doubly-fed alternating-current motor of the compensated, commutator type provided with a plurality of main field windings which comprises energizing a portion of said main field windings by the cross field current and the remainder of said main field windings by the difference between the armature and cross-field currents at certain speeds under light load, and eliminating said last named main field windings from circuit at the same speeds under heavy load.

12. The method of operating an alternating-current motor of the compensated, commutator type provided with a plurality of main field windings which comprises energizing a portion of said main field windings by the cross-field current under heavy load at certain speeds and, in addition, energizing the remainder of said main field windings by the difference between the armature and cross-field currents at corresponding speeds under light load.

In testimony whereof, I have hereunto subscribed my name this 31st day of March 1916.

RUDOLF E. HELLMUND.

Copies of this patent may be obtained for five cents each, by addressing the "Commissioner of Patents, Washington, D. C."